(12) United States Patent
Littlejohn (10) Patent No.: US 10,009,130 B1
(45) Date of Patent: Jun. 26, 2018

(54) INTERNET RADIO STREAM GENERATION

(71) Applicant: iHeartMedia Management Services, Inc., San Antonio, TX (US)

(72) Inventor: Jeff Littlejohn, Cincinnati, OH (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days. days.

(21) Appl. No.: 15/462,243

(22) Filed: Mar. 17, 2017

(51) Int. Cl.
  *H04H 20/88* (2008.01)
  *H04H 20/72* (2008.01)
  *H04L 29/06* (2006.01)
  *H04L 29/12* (2006.01)

(52) U.S. Cl.
  CPC ............ *H04H 20/88* (2013.01); *H04H 20/72* (2013.01); *H04L 61/6068* (2013.01); *H04L 65/608* (2013.01)

(58) Field of Classification Search
  CPC ........ H04H 20/88; H04H 20/26; H04H 60/37; H04H 60/91; H04H 20/93; H04H 20/72; H04H 20/10; H04H 60/58
  USPC ..... 455/3.01–3.06, 422.1, 414.1–414.4, 403, 455/426.1, 426.2, 445, 466, 418–420, 455/454, 500, 517, 67.11, 550.16; 725/59, 61, 62, 74
  See application file for complete search history.

(56) References Cited

U.S. PATENT DOCUMENTS

| 6,577,716 B1 | 6/2003 | Minter et al. |
| 2012/0269354 A1* | 10/2012 | Doherty ............... G10L 19/005 381/56 |
| 2016/0165319 A1 | 6/2016 | Sun |

OTHER PUBLICATIONS

"Ad Replacement," TIBUS, retrieved Apr. 7, 2017 <https://www.tibus.com/cdn-streaming-solutions/ad-replacement/>, 4 pages.

* cited by examiner

*Primary Examiner* — Keith Ferguson
(74) *Attorney, Agent, or Firm* — Toler Law Group, PC (57) ABSTRACT

A system includes a first source interface, a second source interface, a content mixer, a first communication interface (CI), and a second CI. The first source interface and the second source interface are configured to receive a first audio signal (FS) and a second audio signal (SS), respectively. The content mixer is configured to generate a portion of a terrestrial broadcast stream (TBS portion) that includes the FS and the SS. A first segment of the FS overlaps a second segment of the SS. The content mixer is configured to generate a portion of an internet radio stream (IR portion) corresponding to the TBS portion. The IR portion includes the first segment and omits the SS. The first CI is configured to send the TBS portion to a terrestrial radio station. The second CI is configured to send the IR portion to a content replacer. Other aspects are also disclosed.

20 Claims, 4 Drawing Sheets

INTERNET RADIO STREAM GENERATION

I. FIELD

The present disclosure relates to systems and methods of generating an internet radio stream.

II. BACKGROUND

In broadcast radio, audio signals from a variety of sources are combined to generate a radio broadcast stream. For example, the radio broadcast stream may include a voice of a radio announcer followed by a music track. The radio announcer may continue speaking while segueing to the music track. An overlapping portion of the radio broadcast stream may include both the voice of the radio announcer and a beginning portion of the music track. The radio broadcast stream may be used to generate an internet radio stream. Due to various reasons, such as licensing restrictions, the internet radio stream may be generated by replacing some portions of the radio broadcast stream with other audio signals. For example, the music track may be replaced with other audio content. One approach to replacing the music track is to replace the entire music track including remove the overlapping portion of the radio broadcast stream by cutting off the end of the speech of the radio announcer. Another approach to replacing the music track is to partially remove the music track by keeping the overlapping portion of the radio broadcast stream that includes the beginning of the music track and the speech of the radio announcer and cutting off a portion of the music track that is subsequent to the overlapping portion. Listening experience of a user of the internet radio stream is adversely impacted under either approach.

III. SUMMARY

Systems and methods of generating an internet radio stream are disclosed. In a particular implementation, a content mixer that is used to generate a terrestrial broadcast stream by mixing a first audio signal (e.g., a voice of a radio announcer) and a second audio signal (e.g., a music track) also generates a portion of the internet radio stream. For example, the content mixer generates a portion of a terrestrial broadcast stream by overlapping a first segment of the first audio signal and a second segment of the second audio signal in the terrestrial broadcast stream. For example, the voice of the radio announcer may overlap the music track in an overlapping portion of the terrestrial broadcast stream. The content mixer also generates a portion of an internet radio stream such that the portion of the internet radio stream is prepared for replacement of the second audio signal (e.g., the music track), such as by insertion of a third audio signal (e.g., a targeted advertisement). For example, the portion of the internet radio stream includes the first audio signal (e.g., the voice of the radio announcer) and omits the second audio signal (e.g., the music track). To illustrate, when the overlapping portion of the terrestrial broadcast stream includes the voice of the radio announcer and the beginning of the music track, the portion of the internet radio stream may include the voice of the radio announcer and may omit the beginning of the music track. In some examples, the content mixer omits the second audio signal from the portion of the internet radio stream in response to detecting a characteristic of the second audio signal or in response to receiving a user input. The portion of the internet radio stream may indicate silence for a period of time subsequent to the first audio signal. The content mixer may provide the portion of the internet radio stream to a content replacer.

The content replacer generates one or more internet radio streams based on the portion of the internet radio stream. For example, the content replacer may generate an internet radio stream by inserting a third audio signal (e.g., a replacement music track) subsequent to the first audio signal (e.g., the voice of the radio announcer) in the portion of the internet radio stream. To illustrate, the third audio signal may replace the silence in the portion of the internet radio stream. As used herein, "an internet radio stream" refers to a non-broadcast stream. For example, the internet radio stream may include a multicast stream or a unicast stream. The internet radio stream may be distributed via a packet-switched network.

The terrestrial broadcast stream includes the overlapping portion (e.g., the first segment and the second segment). The portion of the internet radio stream includes the entire first audio signal (e.g., includes the first segment) and omits the entire second audio signal (e.g., omits the second segment). If the internet radio stream were instead generated by cutting off the overlapping portion of the terrestrial broadcast stream (e.g., omitting the first segment of the first audio signal), the speech of the radio announcer that is included in the overlapping portion would be abruptly cut off resulting in a negative or undesirable user experience. On the other hand, if the internet radio stream generated were generated by keeping the overlapping portion of the terrestrial broadcast stream and cutting off an ending segment of the second audio signal (e.g., partially removing the second audio signal), the internet radio stream would include the voice of the radio announcer and a beginning of the music track before abruptly transitioning to the replacement music track which would also result in a negative or undesirable user experience. Generating the internet radio stream based on the portion of the internet radio stream, as compared to the terrestrial broadcast stream, may result in the internet radio stream having the entire first audio signal (e.g., including the first segment) and omitting the entire second audio signal (e.g., omitting the second segment). For example, the internet radio stream may include the entire first audio signal from the portion of the internet radio stream and may include the third audio signal (e.g., the replacement music track) subsequent to the first audio signal (e.g., the voice of the radio announcer). To illustrate, the voice of the radio announcer may transition to the replacement music track without the voice being abruptly cut off and without including a beginning of the original music track. Consequently, listening experience of a user of the internet radio stream generated based on the portion of the internet radio stream may be improved, as compared to the internet radio stream generated based on the terrestrial broadcast stream.

In a particular aspect, a method includes generating, at a device, a portion of a terrestrial broadcast stream, the portion of the terrestrial broadcast stream including a first audio signal from a first source and a second audio signal from a second source. A first segment of the first audio signal overlaps a second segment of the second audio signal. The method also includes generating, at the device, a portion of an internet radio stream corresponding to the portion of the terrestrial broadcast stream. The portion of the internet radio stream includes the first segment of the first audio signal and omits the second audio signal. The method further includes sending the portion of the terrestrial broadcast stream from the device to a terrestrial radio station. The method also includes sending the portion of the internet radio stream from the device to a content replacer.

In another particular aspect, a system includes a first source interface, a second source interface, a content mixer, a first communication interface, and a second communication interface. The first source interface is configured to receive a first audio signal from a first source. The second source interface is configured to receive a second audio signal from a second source. The content mixer is configured to generate a portion of a terrestrial broadcast stream. The portion of the terrestrial broadcast stream includes the first audio signal and the second audio signal. A first segment of the first audio signal overlaps a second segment of the second audio signal. The content mixer is also configured to generate a portion of an internet radio stream corresponding to the portion of the terrestrial broadcast stream. The portion of the internet radio stream includes the first segment of the first audio signal and omits the second audio signal. The first communication interface is configured to send the portion of the terrestrial broadcast stream to a terrestrial radio station. The second communication interface is configured to send the portion of the internet radio stream to a content replacer.

In another particular aspect, a computer-readable storage device stores instructions that, when executed by a processor, cause the processor to perform operations including generating a portion of a terrestrial broadcast stream. The portion of the terrestrial broadcast stream includes a first audio signal from a first source and a second audio signal from a second source. A first segment of the first audio signal overlaps a second segment of the second audio signal. The operations also include generating a portion of an internet radio stream corresponding to the portion of the terrestrial broadcast stream. The portion of the internet radio stream includes the first segment of the first audio signal and omits the second audio signal. The operations further include sending the portion of the terrestrial broadcast stream to a terrestrial radio station. The operations also include sending the portion of the internet radio stream to a content replacer Aspects, advantages, and features of the present disclosure will become apparent after review of the entire application, including the following sections: Brief Description, Detailed Description, and the Claims.

IV. BRIEF DESCRIPTION

V. DETAILED DESCRIPTION

The terminology used herein is for the purpose of describing particular aspects only and is not intended to be limiting of the claims. As used herein, the singular forms "a," "an," and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
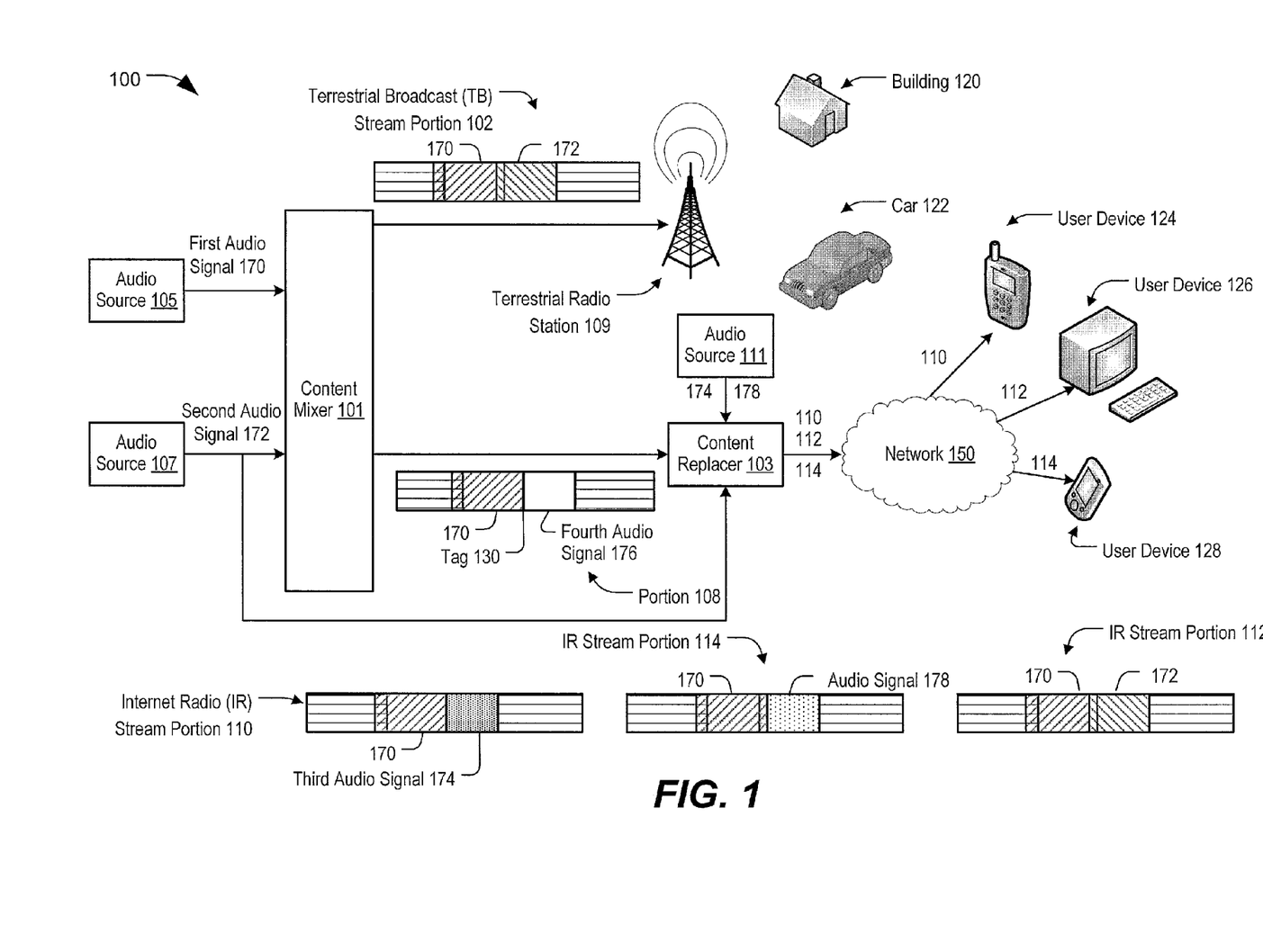
FIG. 1 is a block diagram of a particular illustrative aspect of a system that is operable to generate an internet radio stream.

Referring to FIG. 1, a particular illustrative aspect of a system that is operable to generate an internet radio stream is disclosed and generally designated 100. The system 100 includes or is coupled to a plurality of audio sources. For example, the system 100 includes an audio source 105, an audio source 107, an audio source 111, one or more additional audio sources, or a combination thereof. A particular audio source may include a microphone, a traffic report, a phone call, a satellite transmission, a music source, or an advertising source.

The system 100 includes a content mixer 101 coupled to or in communication with a content replacer 103. The content mixer 101 may be included in a first device, such as a computer, an audio mixing console (e.g., a sound board), another device, or a combination thereof. The content mixer 101 may be configured to mix audio in a digital domain, an analog domain, or both. The content mixer 101 may be configured to overlap content from multiple sources. For example, the content mixer 101 may be configured to receive a first audio signal corresponding to a voice of an announcer from a microphone and to overlap an end of the first audio signal with a beginning of a second audio signal (e.g., an advertisement, a music track, a traffic report, a satellite transmission, an emergency alert, a news report, etc.). The content mixer 101 may be configured to crossfade audio signals from multiple sources, overlap audio signals from multiple sources, or a combination thereof.

The content mixer 101 may be configured to support automatic control or manual control of audio mixing. For example, the content mixer 101 may be configured to perform crossfade, overlap, or both, of audio signals independent of user input or based on user input. The content mixer 101 may be configured to use audio signals from multiple sources to generate an output signal for terrestrial broadcast, as described herein.

The content replacer 103 may be included in the first device or in a second device that is distinct from the first device. The second device may include a computer, a media device, an audio editor, another device, or a combination thereof. The content replacer 103 may be configured to receive a portion of an internet radio stream from the content mixer 101 and add content from one or more sources to generate one or more internet radio streams. In a particular aspect, the content replacer 103 may correspond to a content mixer that is configured to receive an audio signal from the content mixer 101 as a first audio source and to mix the audio signal with another audio signal received from another audio source.

One or more operations described herein as performed by the content mixer 101 may be performed by multiple components of the same device or by multiple devices. One or more operations described herein as performed by the content replacer 103 may be performed by multiple components of the same device or by multiple devices.

The content mixer 101 is coupled to, or in communication with, a terrestrial radio station 109. The terrestrial radio station 109 may be configured to broadcast a signal, such as an amplitude modulation (AM) signal, a frequency modulation (FM) signal, or a digital signal, with content of a terrestrial broadcast. The broadcast signal may be generally accessible by one or more receivers within line of sight of the terrestrial radio station 109. For example, a receiver may tune to a public (e.g., licensed) frequency band to receive a broadcast signal from the terrestrial radio station 109. The terrestrial radio station 109 may be configured to directly transmit to one or more receivers via free space propagation of electromagnetic waves. Consequently, the terrestrial radio station 109 may have limited range, e.g., within a single metro area or similar geographic region.

One or more radio receivers may be within a coverage area of the terrestrial radio station 109. For example, a building 120 may include one or more radio receivers that are within the coverage area of the terrestrial radio station 109. As another example, a car 122 may include one or more radio receivers. The car 122 may enter or exit the coverage area of the terrestrial radio station 109.

The content replacer 103 may be coupled, via a network 150, to one or more user devices. For example, the content replacer 103 may be coupled, via the network 150, to a user device 124 (e.g., a mobile phone), a user device 126 (e.g., a desktop computer), a user device 128 (e.g., a communication device), or a combination thereof. The network 150 may include a packet-switched network. The network 150 may include a wireless network, a wired network, or both.

The content mixer 101 is configured to receive (or access) one or more audio signals from the audio source 105, the audio source 107, or both. The content mixer 101 is configured to generate a portion (e.g., a terrestrial broadcast (TB) stream portion 102) of a TB stream based on the audio signals, as described herein. The content mixer 101 is configured to provide the TB stream portion 102 to the terrestrial radio station 109. The terrestrial radio station 109 is configured to broadcast the TB stream portion 102. One or more radio receivers within a coverage area of the terrestrial radio station 109 may be configured to receive the TB stream portion 102 broadcast by the terrestrial radio station 109.

The content mixer 101 is configured to generate a portion 108 (e.g., an audio portion) of an internet radio stream based on the audio signals, as described herein. The portion 108 may correspond to the TB stream portion 102. The content mixer 101 is configured to provide the portion 108 to the content replacer 103. The content replacer 103 is configured to receive the portion 108 from the content mixer 101. The content replacer 103 may also be configured to receive one or more audio signals from the audio source 107, the audio source 111, another audio source, or a combination thereof. The content replacer 103 is configured to generate one or more internet radio (IR) stream portions based on the portion 108, as described herein. The content replacer 103 is configured to provide, via the network 150, the IR stream portions to one or more user devices.

During operation, the content mixer 101 may receive a first audio signal 170 from the audio source 105, a second audio signal 172 from the audio source 107, or both. The audio source 105 may include at least one of a first microphone, a first traffic report, a first phone call, a first satellite, a first music source, or a first advertising source. The audio source 107 may include at least one of a second microphone, a second traffic report, a second phone call, a second satellite, a second music source, or a second advertising source.

The content mixer 101 may generate the TB stream portion 102 including the first audio signal 170 and the second audio signal 172. The first audio signal 170 may partially overlap the second audio signal 172 in the TB stream portion 102. For example, a first segment of the first audio signal 170 may overlap a second segment of the second audio signal 172 in the TB stream portion 102. To illustrate, the first audio signal 170 may correspond to a voice of a radio announcer, and the second audio signal 172 may correspond to a music track. The audio source 105 may include a microphone into which the radio announcer is speaking. The radio announcer may select the music track. The audio source 107 may include a music source of the music track. The radio announcer may continue speaking during a beginning segment of the music track. The radio announcer may switch off (or pause) the microphone subsequent to the beginning segment of the music track.

The content mixer 101 may generate the TB stream portion 102 including the first audio signal 170 in response to receiving the first audio signal 170 corresponding to the voice of the radio announcer from the microphone. The content mixer 101 may, in response to receiving a selection of the second audio signal 172 (e.g., the music track), add the second audio signal 172 to the TB stream portion 102. A first segment of the first audio signal 170 may overlap a second segment of the second audio signal 172. In a particular aspect, a starting point of the second audio signal 172 in the TB stream portion 102 may be based on a time at which a selection of the second audio signal 172 is received. In an alternative aspect, the selection of the second audio signal 172 may indicate the starting point at which the second audio signal 172 is to be added to the TB stream portion 102. For example, the radio announcer may indicate that the second audio signal 172 is to be added at a starting point corresponding to a particular duration (e.g., 30 seconds) prior to the end of the first audio signal 170 in the TB stream portion 102.

In a particular example, the first audio signal 170 may correspond to a music track and the second audio signal 172 may correspond to an advertisement. A user (e.g., a media provider employee) may select the first audio signal 170 and the second audio signal 172 to include in the TB stream portion 102. The starting point of the second audio signal 172 may be based on user input or a default value. For example, the default value (or the user input) may indicate an overlap period between audio signals or between various types of audio signals. To illustrate, the default value (or the user input) may indicate a particular overlap period (e.g., 30 seconds) for transitioning from a music track to an advertisement. The content mixer 101 may determine the starting point of the second audio signal 172 corresponding to the overlap period (e.g., 30 seconds) prior to the end of the first audio signal 170. The content mixer 101 may provide, at a first time, the TB stream portion 102 to the terrestrial radio station 109.

The content mixer 101 may include a content selection component. The content selection component may correspond to a programmatic radio platform for networks, advertisers, radio stations, or a combination thereof, configured to perform content selection. The content selection component may keep track of broadcast content. For example, the content selection component may store content selection data in memory indicating that the first audio signal 170, the second audio signal 172, or both, were provided to the terrestrial radio station 109 at the first time. The content selection component may select content based on psychographic groups, weather and traffic patterns, purchase behavior, environmental trends, population trends, consumer trends, or a combination thereof. For example, the content selection component may select the first audio signal 170, the second audio signal 172, or both, to provide to the terrestrial radio station 109 based on the content selection data and selection criteria. The content mixer 101 may provide the TB stream portion 102 to one or more emergency alert system (EAS) decoders. The EAS decoders may monitor broadcast content for EAS messages.

The content mixer 101 may process the TB stream portion 102 prior to providing the TB stream portion 102 (e.g., the processed TB stream portion 102) to the terrestrial radio station 109. For example, the content mixer 101 (or an encoder) may insert a tone by performing psychoacoustic masking on the TB stream portion 102. A monitoring device (e.g., a radio receiver device) that receives the TB stream portion 102 may determine whether the content mixer 101 (or the encoder) is operating as expected based on detecting the tone. As another example, the content mixer 101 (or an audio processor) may generate the processed TB stream portion 102 by performing various adjustment operations on the TB stream portion 102, such as reduce overmodulation, compensate for non-linear transmitters, adjust overall loudness level, or a combination thereof. In a particular aspect, the content mixer 101 (or the audio processor) may perform the various adjustment operations subsequent to performing the psychoacoustic masking to insert the tone. The content mixer 101 may send the processed TB stream portion 102 to the terrestrial radio station 109.

The terrestrial radio station 109 may broadcast the TB stream portion 102 (e.g., the processed TB stream portion 102) over-the-air using one or more radio transmitters. The one or more radio receivers of the building 120, the car 122, or both, may receive the TB stream portion 102. One or more speakers may output the TB stream portion 102 (e.g., the processed TB stream portion 102). For example, a user in the building 120 or the car 122 may be listening to content (e.g., the TB stream portion 102) broadcast from the terrestrial radio station 109.

The content mixer 101 may generate the portion 108 (e.g., an audio portion) corresponding to the TB stream portion 102. The portion 108 may include the first audio signal 170 and may omit the second audio signal 172, as further described with reference to FIG. 2. For example, the portion 108 includes the first segment of the first audio signal 170 and omits the second segment of the second audio signal 172. The portion 108 may also include a segment of the first audio signal 170 that is prior to the first segment and may omit a segment of the second audio signal 172 that is subsequent to the second segment.

The content mixer 101 may, in response to receiving a user input, determine that the first audio signal 170 is to be included in the portion 108 and that the second audio signal 172 is to be omitted from the portion 108. For example, the content mixer 101 may, in response to determining that the user input indicates that the first audio signal 170 is to be included in the portion 108, that the second audio signal 172 is to be omitted from the portion 108, or both, determine that the first audio signal 170 is to be included in the portion 108 and that the second audio signal 172 is to be omitted from the portion 108.

In a particular aspect, the content mixer 101 may, in response to detecting a first characteristic of the first audio signal 170, detecting a second characteristic of the second audio signal 172, or both, determine that the first audio signal 170 is to be included in the portion 108 and that the second audio signal 172 is to be omitted from the portion 108. For example, the first characteristic may correspond to a first audio type of the first audio signal 170 and the second characteristic may correspond to a second audio type of the second audio signal 172. A set of audio types may include an advertisement type, a music type, an unrestricted audio type, a traffic report type, a microphone audio type, a weather report type, an emergency alert type, a news type, a talk show type, or a combination thereof.

The content mixer 101 may determine, based on user input, a configuration setting, or both, that audio signals from a first set of audio types are to be included and that audio signals from a second set of audio types are to be omitted. The content mixer 101 may, in response to determining that the TB stream portion 102 includes the first audio signal 170 and that the first audio type is included in the first set of audio types, determine that the first audio signal 170 is to be included in the TB stream portion 102. The content mixer 101 may, in response to determining that the TB stream portion 102 includes the second audio signal 172 and that the second audio type is included in the second set of audio types, determine that the second audio signal 172 is to be omitted from the TB stream portion 102.

The content mixer 101 may, in response to determining that the second audio signal 172 is to be omitted from the TB stream portion 102, insert a tag 130 (e.g., a control tag) in the portion 108. The tag 130 may indicate a content replacement point at the end of the first audio signal 170 or at the beginning of the second audio signal 172.

In a particular aspect, the first characteristic may indicate that the first audio signal 170 corresponds to untargeted audio and the second characteristic may indicate that the second audio signal 172 corresponds to targeted audio. The content mixer 101 may determine, based on user input, a configuration setting, or both, that untargeted audio is to be included and that targeted audio is to be omitted. The content mixer 101 may, in response to determining that the first characteristic indicates that the first audio signal 170 corresponds to untargeted audio, include the first audio signal 170 in the portion 108. The content mixer 101 may, in response to determining that the second characteristic indicates that the second audio signal 172 corresponds to targeted audio (e.g., targeted to the terrestrial radio station 109), omit the second audio signal 172 from the portion 108.

In a particular aspect, the first characteristic may indicate that licensing criteria associated with the first audio signal 170 indicate that the first audio signal 170 has to be included or can be included in the portion 108. The second characteristic may indicate that licensing criteria associated with the second audio signal 172 indicate that the second audio signal 172 has to be omitted or can be omitted from the portion 108. For example, first licensing criteria may indicate that the first audio signal 170 is to be included no more than a threshold number of times (e.g., 5) in internet radio streams in a particular time period (e.g., 5 hours). The content mixer 101 may, in response to determining that the first audio signal 170 has been included fewer than the threshold number of times in internet radio streams during the particular time period (e.g., 5 hours), include the first audio signal 170 in the portion 108. Second licensing criteria may indicate that the second audio signal 172 is to be included no more than a threshold number of times (e.g., 2) in internet radio streams in a particular time period (e.g., 1 hour). The content mixer 101 may, in response to determining that the second audio signal 172 has been included at least the threshold number of times (e.g., 2) in one or more internet radio streams in the particular time period (e.g., a previous 1 hour), omit the second audio signal 172 from the portion 108.

The content mixer 101 may generate the portion 108 to include the first audio signal 170 and a fourth audio signal 176. In a particular aspect, the fourth audio signal 176 may indicate silence for a particular duration, as further described with reference to FIG. 2. The content mixer 101 may provide the portion 108 to the content replacer 103.

The content mixer 101 may process the portion 108 prior to providing the portion 108 to the content replacer 103. For example, the content mixer 101 (e.g., an audio processor) may generate an audio processed portion 108 by processing the portion 108 to reduce overmodulation, compensate for non-linear transmitters, adjust overall loudness, or a combination thereof. The content mixer 101 (e.g., an audio encoder) may perform analog-to-digital conversion of the portion 108 (e.g., the audio processed portion 108) to generate a digital portion 108. The content mixer 101 (e.g., a chunker) may generate one or more chunks of the portion 108 (e.g., the digital portion 108). For example, the chunker may codify (e.g., convert) the portion 108 (e.g., the digital portion 108) to a supported format (e.g., moving picture expert group (MPEG) audio layer 3 (MP3), advanced audio coding (AAC), audio coding 3 (AC-3), enhanced AC-3 (EC-3), or another format). The chunker may encapsulate the portion 108 (e.g., the codified portion 108) in a transport stream file. The chunker may divide the transport stream file into fragments of equal length. The content replacer 103 may receive the fragments representing the portion 108.

The content replacer 103 may generate, based on the portion 108, one or more internet radio (IR) stream portions corresponding to the TB stream portion 102. For example, the content replacer 103 may generate an IR stream portion 110 to be sent to a first set of devices, an IR stream portion 112 to be sent to a second set of devices, an IR stream portion 114 to be sent to a third set of devices, one or more additional IR stream portions, or a combination thereof, as described herein. Each of the IR stream portion 110, IR stream portion 112, and the IR stream portion 114 may correspond to the TB stream portion 102. The first set of devices may include the user device 124, one or more additional devices, or a combination thereof. The second set of devices may include the user device 126, one or more additional devices, or a combination thereof. The third set of devices may include the user device 128, one or more additional devices, or a combination thereof.

The content replacer 103 may select one or more audio signals to include in each of the IR stream portions, as described herein. The content replacer 103 may receive (or access) a plurality of audio signals from one or more audio sources. For example, the content replacer 103 may receive the first audio signal 170 from the audio source 105, the second audio signal 172 from the audio source 107, a third audio signal 174 from the audio source 174, an audio signal 178 from the audio source 174, or a combination thereof. In a particular aspect, the audio source 111 is the same as the audio source 105. In an alternative aspect, the audio source 111 is distinct from the audio source 105. The audio source 111 may be the same as or distinct from the audio source 107. In a particular aspect, the content replacer 103 receives the third audio signal 174 from the audio source 174 and receives the audio signal 178 from an audio source that is distinct from the audio source 174.

The content replacer 103 may select the third audio signal 174 to be included in the IR stream portion 110, the second audio signal 172 to be included in the IR stream portion 112, the fourth audio signal 176 to be included in the IR stream portion 114, one or more audio signals to be added to one or more additional IR stream portions, or a combination thereof. For example, the content replacer 103 (e.g., a content selection component) may select the third audio signal 174 in response to determining that including the third audio signal 174 in the IR stream portion 110 satisfies selection criteria associated with the first set of devices, distribution criteria associated with the third audio signal 174, or a combination thereof. To illustrate, the content selection component may select the third audio signal 174 in response to determining that distribution criteria indicate that the third audio signal 174 is to be included an internet radio stream fewer than a threshold number of times in a particular duration and that the third audio signal 174 has been included in an internet radio stream fewer than the threshold number of times during the particular duration. In a particular aspect, the content selection component may select the third audio signal 174 in response to determining that selection criteria indicate that the third audio signal 174 is associated with particular demographics and that the first set of devices is associated with the particular demographics. The content selection component may determine that the first set of devices is associated with the particular demographics in response to determining that user demographic information indicates that users of the first set of devices are associated with the particular demographics.

The content replacer 103 may generate the IR stream portion 110 including the first audio signal 170 and the third audio signal 174. The IR stream portion 110 may omit the second audio signal 172. The third audio signal 174 may or may not partially overlap the first audio signal 170 in the IR stream portion 110. In a particular aspect, the tag 130 indicates the content replacement point at the beginning of the second audio signal 172. In this aspect, the third audio signal 174 partially overlaps the first audio signal in the IR stream portion 110. In an alternative aspect, the tag 130 indicates the content replacement point at the end of the first audio signal 170. In this aspect, the third audio signal 174 is subsequent to the first audio signal 170 and does not overlap the first audio signal 170. In a particular implementation, the content replacer 103 may generate the IR stream portion 110 by replacing the fourth audio signal 176 with the third audio signal 174 in the portion 108.

In a particular aspect, the content replacer 103 may add one or more fragments corresponding to the third audio signal 174 to fragments corresponding to the portion 108 (portion fragments). For example, the content replacer 103 may receive the portion fragments from the content mixer 101 (e.g., the chunker). The portion fragments may include one or more first fragments corresponding to the first audio signal 170. In a particular aspect, the portion fragments may include one or more silence fragments corresponding to the fourth audio signal 176. The content replacer 103 may generate one or more replacement fragments corresponding to the third audio signal 174. For example, the content replacer 103 may generate a transport stream file by codifying and encapsulating the third audio signal 174, and may divide the transport stream file into the replacement fragments. The content replacer 103 may add the replacement fragments to the portion fragments. For example, the content replacer 103 may receive an index file that contains references of the portion fragments. The content replacer 103 may update the index file to include references to the replacement fragments. For example, the updated index file may indicate that the replacement fragments are subsequent to the first fragments. In a particular aspect, the content replacer 103 may update the index file to remove references to the silence fragments in the portion 108. In a particular aspect, the index file may include the tag 130. The tag 130 may indicate that the content replacement point is subsequent to the first fragments. The content replacer 103 may update the index file to indicate that the replacement fragments begin at the content replacement point.

In a particular aspect, the content replacer 103 may generate the replacement fragments prior to receiving the portion 108 from the content mixer 101. The content replacer 103 may, in response to receiving the portion fragments and the index file, update the index file to include references to the replacement fragments. Updating the index file to generate the IR stream portion 110 may reduce an end-to-end delay as compared to receiving the portion 108

(e.g., unfragmented portion 108), codifying the first audio signal 170 and the third audio signal 174, encapsulating the codified signal, and fragmenting the encapsulated signal. The reduced end-to-end delay may enable the user device 124 to receive the IR stream portion 110 concurrently with (or shortly after) the car 122 receiving the TB stream portion 102 from the terrestrial radio station 109.

The content replacer 103 may generate the IR stream portion 112 including the first audio signal 170 and the second audio signal 172. The second audio signal 172 may or may not partially overlap the first audio signal 170 in the IR stream portion 112. In a particular aspect, the content replacer 103 may generate the IR stream portion 112 by replacing the fourth audio signal 176 with the second audio signal 172 in the portion 108. The portion 108 may thus be used to generate the IR stream portion 110 that omits the second audio signal 172, the IR stream portion 112 that includes the second audio signal 172, or both.

The content replacer 103 may generate the IR stream portion 114 including the first audio signal 170 and the audio signal 178. The IR stream portion 114 may omit the second audio signal 172. The audio signal 178 may or may not partially overlap the first audio signal 170 in the IR stream portion 114. In a particular aspect, the content replacer 103 may generate the IR stream portion 114 by replacing the fourth audio signal 176 with the audio signal 178 in the portion 108.

The content replacer 103 may provide the IR stream portion 110, the IR stream portion 112, the IR stream portion 114, one or more additional stream portions, or a combination thereof, to the network 150 (e.g., a content distribution network). For example, the content replacer 103 may send the IR stream portion 110, via the network 150, to the user device 124, one or more other devices of the first set of devices, or a combination thereof. The content replacer 103 may send the IR stream portion 112, via the network 150, to the user device 126, one or more other devices of the second set of devices, or a combination thereof. The content replacer 103 may send the IR stream portion 112, via the network 150, to the user device 128, one or more other devices of the third set of devices, or a combination thereof.

Generating, at the content replacer 103, the IR stream portion 110 based on the portion 108 provides a transition from the first audio signal 170 to the third audio signal 174 without cutting off an ending segment (e.g., the first segment) of the first audio signal 170 and without including a beginning segment (e.g., the second segment) of the second audio signal 172. For example, the IR stream portion 110 includes the first segment and omits the second segment. The third audio signal 174 may be subsequent to the first segment of the first audio signal 170 in the IR stream portion 110 or may at least partially overlap the first segment of the first audio signal 170. Including the third audio signal 174, as compared to the second audio signal 172, in the IR stream portion 110 may enable targeted content delivery, licensing regulation compliance, targeted advertising, or a combination thereof. For example, the second audio signal 172 may include a first advertisement targeted to users within a broadcast region (e.g., a coverage area) of the terrestrial radio station 109 and the third audio signal 174 may include a second advertisement targeted to a location associated with the user device 124 receiving the IR stream portion 110.

Figure 2:
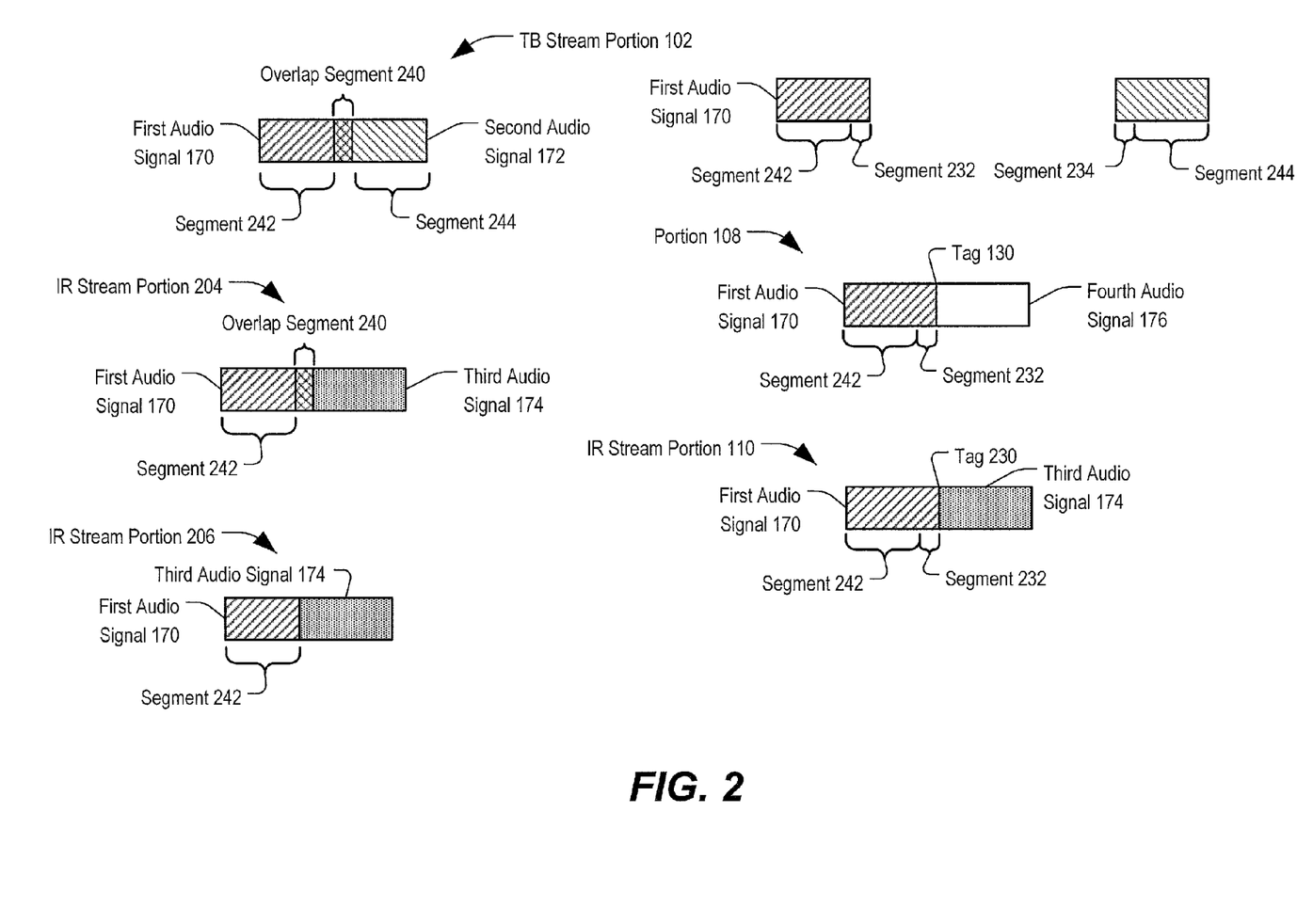
FIG. 2 is a diagram of examples of internet radio streams generated by the system of FIG. 1.

Referring to FIG. 2, various examples of IR stream portions and an example of the TB stream portion 102 are disclosed. The TB stream portion 102, one or more of the IR stream portions, or a combination thereof, may be generated by the system 100, the content mixer 101, the content replacer 103 of FIG. 1, or a combination thereof.

The first audio signal 170 may overlap the second audio signal 172 at an overlap segment 240 of the TB stream portion 102. For example, a segment 232 of the first audio signal 170 may overlap a segment 234 of the second audio signal 172. A segment 242 of the first audio signal 170 may be prior to the segment 232. A segment 244 of the second audio signal 172 may be subsequent to the segment 234.

In a first approach, an IR stream portion 204 generated based on the TB stream portion 102 may include the segment 242, the overlap segment 240 (e.g., the segment 232 and the segment 234), and the third audio signal 174. The overlap segment 240 includes a beginning segment (e.g., the segment 234) of the second audio signal 172.

In a second approach, an IR stream portion 206 generated based on the TB stream portion 102 may include the segment 242 and the third audio signal 174. An ending segment (e.g., the segment 232) of the first audio signal 170 is omitted in the IR stream portion 206.

The content mixer 101 may generate the portion 108, as described with reference to FIG. 1. The portion 108 may include the first audio signal 170 (e.g., the segment 242 and the segment 232). In a particular aspect, the portion 108 may include the fourth audio signal 176. The fourth audio signal 176 may indicate silence for a particular duration. The particular duration may be based on playback duration of the second audio signal 172. For example, the particular duration may be based on (e.g., equal to) playback duration of the segment 244 of the second audio signal 172. The content mixer 101 may add the tag 130 to the portion 108, as described with reference to FIG. 1. The tag 130 may indicate a content replacement point at an end of the first audio signal 170. The content mixer 101 may provide the portion 108 to the content replacer 103.

The content replacer 103 may select the third audio signal 174, as described with reference to FIG. 1, in response to detecting the tag 130 in the portion 108. In a particular aspect, the content replacer 103 may select the third audio signal 174 based at least in part on determining that a playback duration of the third audio signal 174 is less than or equal to a playback duration of the fourth audio signal 176. For example, the content replacer 103 may select the third audio signal 174 based at least in part on determining that the playback duration of the third audio signal 174 is less than or equal to the particular duration of the silence.

The content replacer 103 may generate the IR stream portion 110 by inserting the third audio signal 174 in the portion 108 at the content replacement point indicated by the tag 130, as described with reference to FIG. 1. In a particular aspect, the content replacer 103 may generate the IR stream portion 110 by replacing the fourth audio signal 176 with the third audio signal 174 in the portion 108.

The IR stream portion 110 generated based on the portion 108 includes the entire first audio signal 170 (e.g., including the segment 232 unlike the IR stream portion 206) and omits the entire second audio signal 172 (e.g., omitting the segment 234 unlike the IR stream portion 204). A user listening to the IR stream portion 110 may have an improved experience without the first audio signal 170 cut short (as in the IR stream portion 206) and without including a beginning segment (e.g., the segment 234) of the second audio signal 172 (as in the IR stream portion 204).

Figure 3:
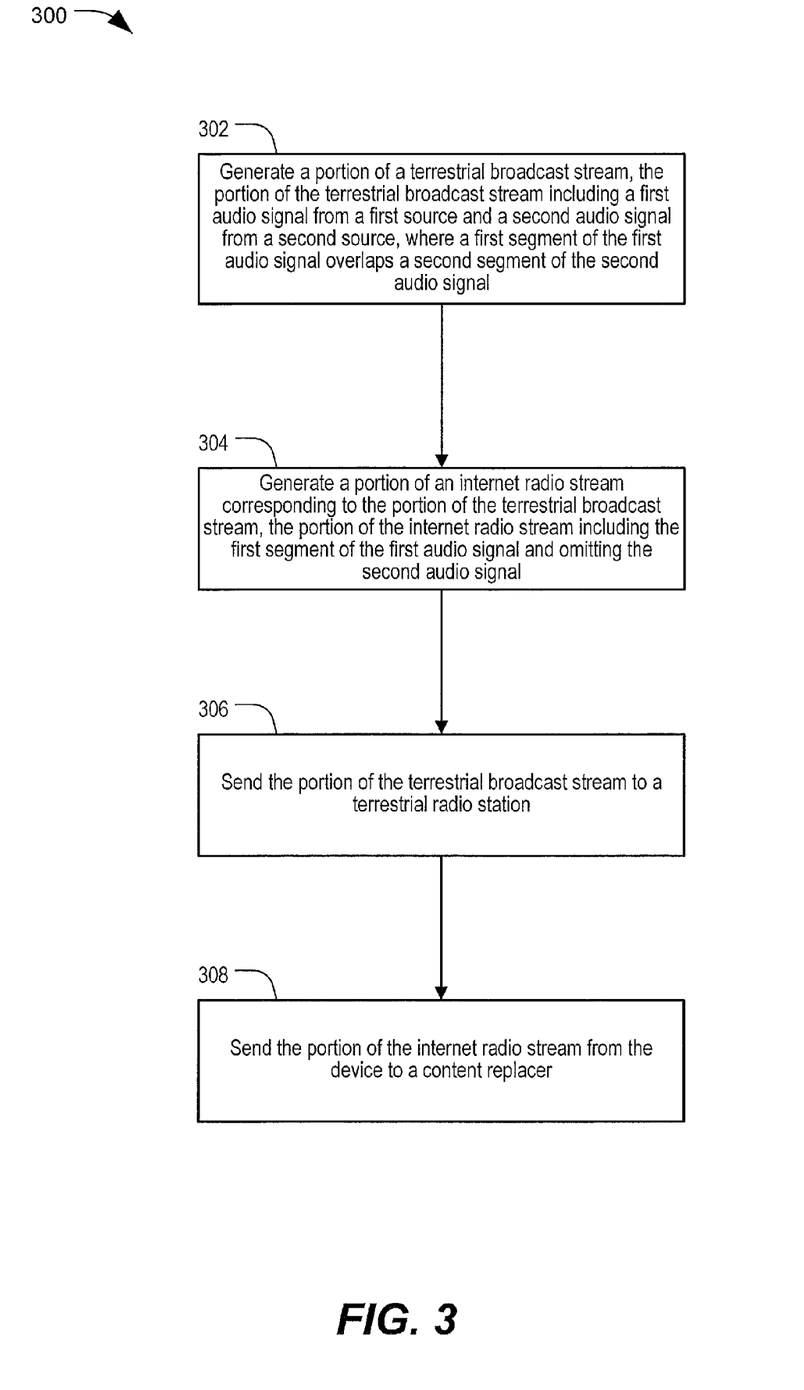
FIG. 3 is a flow chart to illustrate an aspect of generating an internet radio stream.

Referring to FIG. 3, an example of a method of is shown and generally designated 300. The method 300 may be performed by the content mixer 101, the system 100 of FIG. 1, or a combination thereof.

The method 300 includes generating a portion of a terrestrial broadcast stream, at 302. For example, the content mixer 101 may generate the TB stream portion 102, as described with reference to FIG. 1. The TB stream portion 102 may include the first audio signal 170 from the audio source 105 and the second audio signal 172 from the audio source 107. The segment 232 of the first audio signal 170 may overlap the segment 234 of the second audio signal 172.

The method 300 also includes generating a portion of an internet radio stream corresponding to the portion of the terrestrial broadcast stream, at 304. For example, the content mixer 101 may generate the portion 108 corresponding to the TB stream portion 102, as described with reference to FIG. 1. The portion 108 may include the segment 232 of the first audio signal 170 and may omit the second audio signal 172 (e.g., omit the segment 234 and the segment 244).

The method 300 further includes sending the portion of the terrestrial broadcast stream to a terrestrial radio station, at 306. For example, the content mixer 101 may send the TB stream portion 102 to the terrestrial radio station 109, as described with reference to FIG. 1.

The method 300 also includes sending the portion of the internet radio stream from the device to a content replacer, at 308. For example, the content mixer 101 may send the portion 108 to the content replacer 103, as described with reference to FIG. 1.

The method 300 thus enables generation of the portion 108 that includes the entire first audio signal 170 (e.g., including the segment 232) and omits the entire second audio signal 172 (e.g., including the segment 234). The portion 108 may be used to generate one or more internet radio streams. For example, one audio signal may be added to the portion 108 to generate a first internet radio stream and another audio signal may be added to the portion 108 to generate a second internet radio stream. Generating the one or more internet radio streams based on the portion 108 may improve listener experience by including the entire first audio signal 170 (e.g., including the segment 232) and omitting the entire second audio signal 172 (e.g., including the segment 234).

Figure 4:
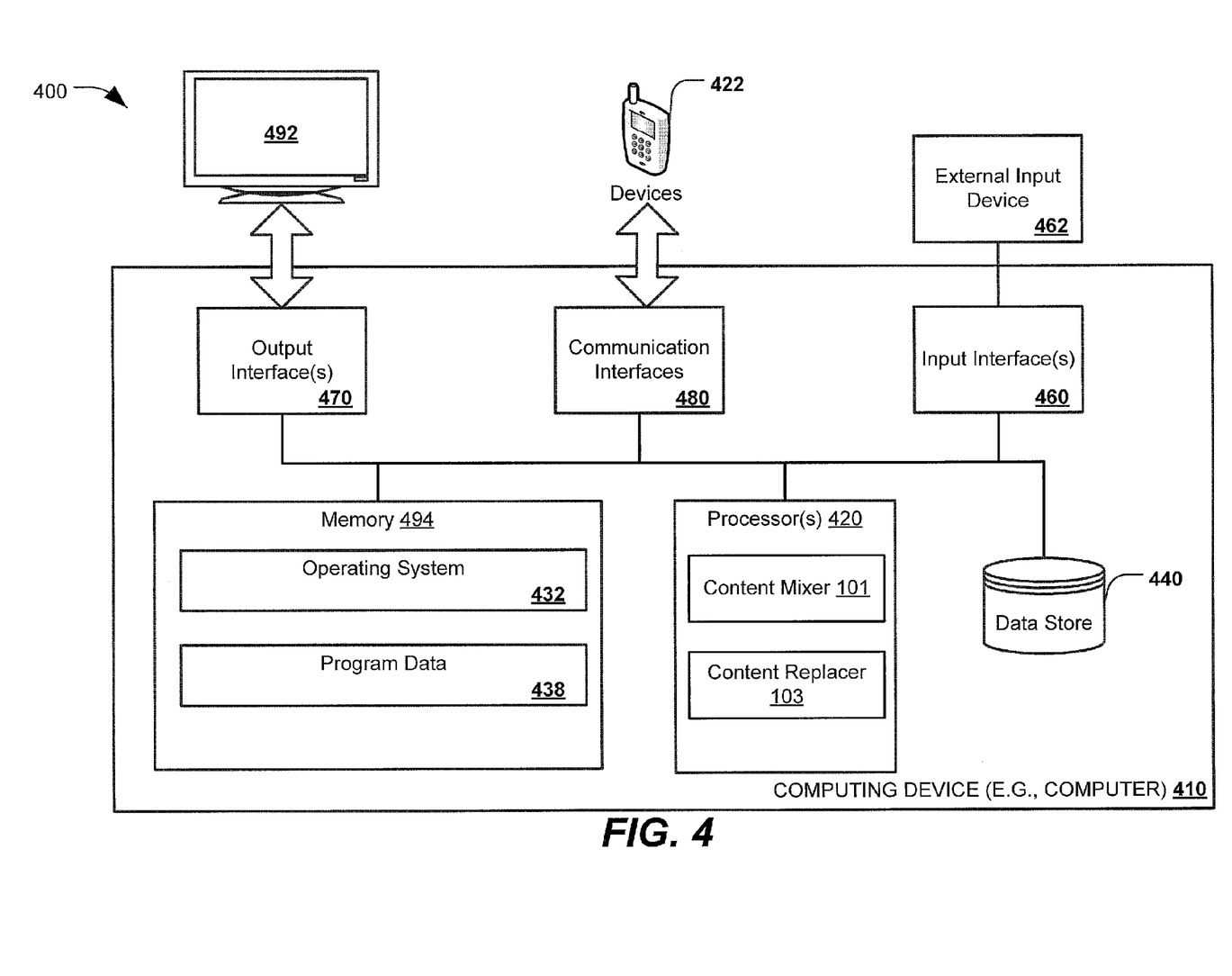
FIG. 4 is a block diagram of a device operable to perform internet radio stream generation in accordance with the systems, devices, and methods of FIGS. 1-3.

FIG. 4 is a block diagram of a computing environment 400 including a computing device 410 that is operable to support aspects of computer-implemented methods, computer program products, and system components according to the present disclosure.

The computing device 410 includes at least one processor 420 and a memory 494 (e.g., a system memory). For example, the computing device 410 may be a desktop computer, a laptop computer, a tablet computer, a server, a cloud computing device, or any other fixed or mobile computing device. The at least one processor 420 may include the content mixer 101, the content replacer 103, or both. Depending on the configuration and type of computing device, the memory 494 may include volatile (such as random access memory or "RAM"), non-volatile (such as read-only memory or "ROM," flash memory, and similar memory devices that maintain stored data even when power is not provided), a combination thereof, or some other memory. The memory 494 may store an operating system 432, program data 438, or both. The program data 438 may include the first audio signal 170, the second audio signal 172, the third audio signal 174, the fourth audio signal 176, the audio signal 178, the TB stream portion 102, the portion 108, the IR stream portion 110, the IR stream portion 112, the IR stream portion 114 of FIG. 1, the tag 130, the IR stream portion 204, the IR stream portion 206 of FIG. 2, or a combination thereof. In an illustrative aspect, the computing device 410 may correspond to the content mixer 101, the content replacer 103, or both, of FIG. 1.

The computing device 410 may also have additional features or functionality. For example, the computing device 410 may also include removable and/or non-removable additional data storage devices, such as magnetic disks, optical disks, tape, and memory cards. Such additional storage is illustrated in FIG. 4 by a data store 440. Computer-readable or processor-readable storage media may include volatile and/or non-volatile storage and removable and/or non-removable media implemented in any technology for storage of information such as computer-readable instructions, data structures, program components or other data. The memory 494 and the data store 440 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 410. Any such computer storage media may be part of the computing device 410.

The computing device 410 may also have one or more input devices, such as an external device 462, a keyboard, a mouse, a track pad, a microphone, etc. may be connected via one or more input interfaces 460. At least one input interface of the input interfaces 460 may enable the computing device 410 to communicate with the audio source 105, the audio source 107, the audio source 111, one or more additional audio sources, or a combination thereof. One or more output devices, such as an illustrative display device 492, speakers, a printer, etc. may also be connected to the computing device 410 via one or more output interfaces 470. The input interfaces 460 and the output interfaces 470 may each include one or more wired or wireless interfaces, such as a universal serial bus (USB) interface, a video graphics array (VGA) interface, a serial interface, a digital visual interface (DVI), a high-definition multimedia interface (HDMI), or some other interface. In certain aspects, such as when the computing device 410 is a server, the input interfaces 460 and the output interfaces 470 may not be included.

The computing device 410 has one or more communication interfaces 480 that enable the computing device 410 to communicate with other computing devices 422. For example, at least one communication interface of the communication interfaces 480 may enable the computing device 410 to communicate with the content replacer 103. To illustrate, at least one communication interface of the communication interfaces 480 may be configured to output the portion 108 to the content replacer 103. At least communication interface of the communication interfaces 480 may enable the computing device 410 to communicate (e.g., via the network 150) with the user device 124, the user device 126, the user device 128 of FIG. 1, or a combination thereof. At least one communication interface of the communication interfaces 480 may enable the computing device 410 to communicate (e.g., via the terrestrial radio station 109) with the building 120, the car 122 of FIG. 1, or a combination thereof. For example, at least one communication interface of the communication interfaces 480 may be configured to output the TB stream portion 102 to the terrestrial radio station 109. At least one communication interface of the communication interfaces 480 may enable the computing device 410 to communicate (e.g., via a network) with the audio source 105, the audio source 107, the audio source 111, one or more additional audio sources, or a combination thereof.

Particular aspects of disclosed techniques may be implemented in conjunction with a client-server architecture. To illustrate, the computing device 410 may be an application server or other server that receives the first audio signal 170 and the second audio signal 172, generates the TB stream portion 102 and the portion 108, provides the TB stream portion 102 to the terrestrial radio station 109, and provides the portion 108 to the content replacer 103.

It will be appreciated that not all of the components or devices illustrated in FIG. 4 or otherwise described in the previous paragraphs are necessary to support aspects as herein described. It will also be appreciated that the computing device 410 may have additional or different components or devices than illustrated in FIG. 4 or otherwise described in the previous paragraphs.

Although the exemplary aspects described herein are intended to enable a person skilled in the art to practice such aspects, it should be understood that other aspects may be realized and that logical and physical changes may be made without departing from the scope of the present disclosure. Thus, the detailed description herein is presented for purposes of illustration only.

In one aspect, portions of the present disclosure may be implemented using a system that includes a software module, logic engines, computer hardware, databases, and/or computer networks. Moreover, while the description may make reference to specific technologies, system architectures, and data management techniques, it will be appreciated that other devices and/or methods that use different technologies, architectures, or techniques may be implemented without departing from the scope of the disclosure. This disclosure is intended to cover any and all subsequent adaptations or variations of various aspects.

As will be appreciated by one skilled in the art, some aspects may be embodied as a system, method, or computer program product. Accordingly, some aspect may take the form of an entirely hardware implementation, an entirely software implementation (including firmware, resident software, micro-code, etc.) or a combination of software and hardware aspects that may all generally be referred to herein as a "circuit," "module," or system." Furthermore, some aspects may take the form of a computer program product embodied in a tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc. Computer program code for carrying out operations of the disclosure may be written in any combination of one or more programming languages, including an object oriented programming language, such as Java, Smalltalk, C++, or the like, and conventional procedural programming languages, such as the "C" programming language, or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various aspects are described with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create mans for implementing the functions/acts specified in the flowchart and/or block diagram block or blocks. The computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in FIGS. 1-4 illustrate the architecture, functionality, and operation of possible implementations of systems, methods, and computer program products according to various disclosed aspects. In this regard, each block in the flowchart or block diagrams may represent a module, a segment, or a portion of code, which includes one or more executable instructions for implementing the specified logical function(s). It should also be noted that, in some alternative implementations, the functions noted in the block may occur out of order noted in the FIGS. 1-4. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope and spirit of this technology. Some implementations were chosen and described in order to explain the principles and practical application, and to enable others of ordinary skill in the art to understand various implementations with various modifications as are suited to particular uses contemplated.

The Abstract is not intended to be used in interpreting or limiting the scope or meaning of the claims. In addition, the disclosure is not to be interpreted as indicating that the claimed aspects require more features than are expressly recited in each claim. Thus, the present disclosure is not intended to be limited to the aspects shown herein but is to be accorded the widest scope possible consistent with the principles and novel features as defined by the following claims.

The invention claimed is:

1. A system comprising:
a first source interface configured to receive a first audio signal from a first source;
a second source interface configured to receive a second audio signal from a second source;
a content mixer configured to:
generate a portion of a terrestrial broadcast stream, the portion of the terrestrial broadcast stream including the first audio signal and the second audio signal, wherein a first segment of the first audio signal overlaps a second segment of the second audio signal; and
generate a portion of an internet radio stream corresponding to the portion of the terrestrial broadcast stream, the portion of the internet radio stream including the first segment of the first audio signal and omitting the second audio signal;
a first communication interface configured to send the portion of the terrestrial broadcast stream to a terrestrial radio station; and
a second communication interface configured to send the portion of the internet radio stream to a content replacer.

2. The system of claim 1, wherein the content mixer is further configured to insert a control tag in the portion of the internet radio stream, the control tag indicating a content replacement point.

3. The system of claim 2, further comprising an input interface configured to receive a user input, wherein the content mixer is configured to insert the control tag in response to receiving the user input.

4. The system of claim 2, wherein the content mixer is further configured to insert the control tag in response to detecting a characteristic of the second audio signal.

5. The system of claim 1, wherein the second audio signal includes content associated with a broadcast region of the terrestrial radio station.

6. A method comprising:
generating, at a device, a portion of a terrestrial broadcast stream, the portion of the terrestrial broadcast stream including a first audio signal from a first source and a second audio signal from a second source, wherein a first segment of the first audio signal overlaps a second segment of the second audio signal;
generating, at the device, a portion of an internet radio stream corresponding to the portion of the terrestrial broadcast stream, the portion of the internet radio stream including the first segment of the first audio signal and omitting the second audio signal;
sending the portion of the terrestrial broadcast stream from the device to a terrestrial radio station; and
sending the portion of the internet radio stream from the device to a content replacer.

7. The method of claim 6, wherein the second source includes an advertising source.

8. The method of claim 6, wherein the second audio signal includes audio of an advertisement.

9. The method of claim 6, further comprising inserting, at the device, a control tag in the portion of the internet radio stream, the control tag indicating a content replacement point.

10. The method of claim 9, wherein the control tag is inserted at the end of the first audio signal.

11. The method of claim 9, wherein the control tag is inserted in response to detecting a characteristic of the second audio signal.

12. The method of claim 9, wherein the control tag is inserted in response to receiving a user input.

13. The method of claim 9, further comprising, in response to detecting the control tag in the portion of the internet radio stream, inserting a third audio signal in the internet radio stream at the content replacement point.

14. The method of claim 9, further comprising:
selecting a third audio signal based on user demographic information; and
inserting the third audio signal in the internet radio stream at the content replacement point.

15. The method of claim 6, wherein the second audio signal includes content associated with a broadcast region of the terrestrial radio station.

16. The method of claim 6, further comprising:
generating a first internet radio stream by inserting a third audio signal in the internet radio stream; and
sending the first internet radio stream to a first user device.

17. The method of claim 16, further comprising:
generating a second internet radio stream by inserting a fourth audio signal in the internet radio stream; and
sending the second internet radio stream to a second user device.

18. The method of claim 6, wherein the first source includes at least one of a first microphone, a first traffic report, a first phone call, a first satellite transmission, a first music source, or a first advertising source, and wherein the second source includes at least one of a second microphone, a second traffic report, a second phone call, a second satellite transmission, a second music source, or a second advertising source.

19. A computer-readable storage device storing instructions that, when executed by a processor, cause the processor to perform operations comprising:
- generating a portion of a terrestrial broadcast stream, the portion of the terrestrial broadcast stream including a first audio signal from a first source and a second audio signal from a second source, wherein a first segment of the first audio signal overlaps a second segment of the second audio signal;
- generating a portion of an internet radio stream corresponding to the portion of the terrestrial broadcast stream, the portion of the internet radio stream including the first segment of the first audio signal and omitting the second audio signal;
- sending the portion of the terrestrial broadcast stream to a terrestrial radio station; and
- sending the portion of the internet radio stream to a content replacer.

20. The computer-readable storage device of claim 19, wherein the portion of the internet radio stream is sent to the content replacer to initiate insertion of a third audio signal in the internet radio stream, the internet radio stream provided to a content distribution network.

\* \* \* \* \*